July 20, 1943.  C. W. MOTT  2,324,868

TWO-WAY PLOW

Filed Sept. 23, 1940  3 Sheets-Sheet 1

Inventor
Carl W. Mott
By Paul O. Pippel
Atty.

Inventor
Carl W. Mott
By Paul O. Pippel
Atty.

Patented July 20, 1943

2,324,868

UNITED STATES PATENT OFFICE 2,324,868

TWO-WAY PLOW

Carl W. Mott, La Grange, Ill., assignor to International Harvester Company, a corporation of New Jersey Application September 23, 1940, Serial No. 357,879

11 Claims. (Cl. 97—50)

This invention relates to tractor mounted implements, and more particularly to direct connected two-way plows and to the power lifting arrangement for effecting alternate control of the respective right-hand and left-hand plow bottoms thereof.

It is an object of the present invention to provide a simplified power lifting arrangement wherein there is supplied an individual control means for each of the respective plows.

Another object of the invention is to provide a simplified means for the connection of the power means with the tractor wherein the same may have its individual control means readily accessible to the operator's station on the tractor.

According to the present invention there has been provided individual fluid actuating cylinder devices at each side of the tractor and connected directly with the respective right-hand and left-hand plows for effecting the movement of the same to their lifted or transport position. These cylinder devices are so connected to the rear axle housing of the tractor as to be in a position for the attachment thereto of individual control means which will be accessible from the operator's station on the tractor. By operation of the individual control means either one or the other of the plows may be locked in their lifted or transport position, leaving the other cylinder free to provide movement to the other plow independently of the locked plow. In one form of the invention, there is provided a main control lever for causing fluid to be directed to the fluid devices and for the effecting of the normal return of the fluid to the reservoir side of the pump. The operator may select one or the other of the individual valves for locking fluid in the cylinders and upon operation of the main lever to effect lowering, the cylinder device which is unlocked will be effective to permit lowering of its plow.

There is another form of the invention where instead of having three levers to obtain the desired control, an arrangement is provided wherein the same can be controlled by use of but two levers adapted to be operated by the operator from the operator's station.

For other objects and for a better understanding of the invention, reference may be had to the following detailed description taken in connection with the accompanying drawings, in which.

Figure 1:
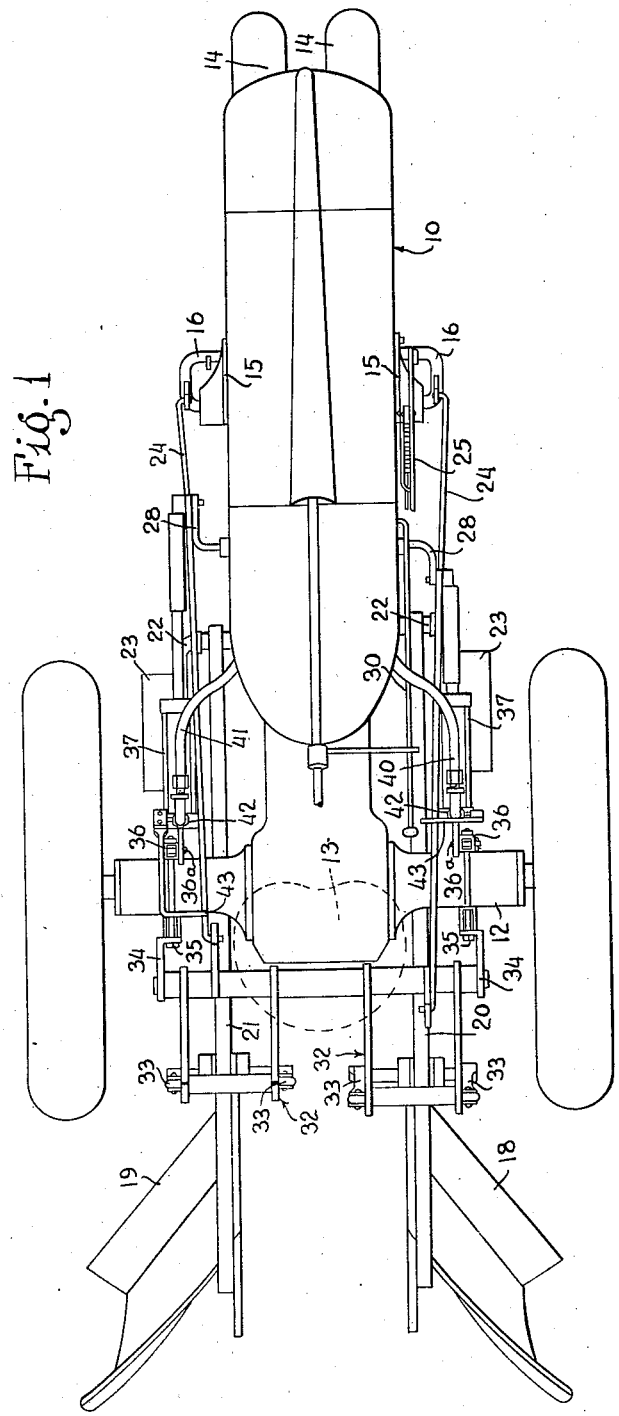
Figure 1 is a plan view of a tractor with plows and with the power mechanism of the present invention attached.
Figure 2:
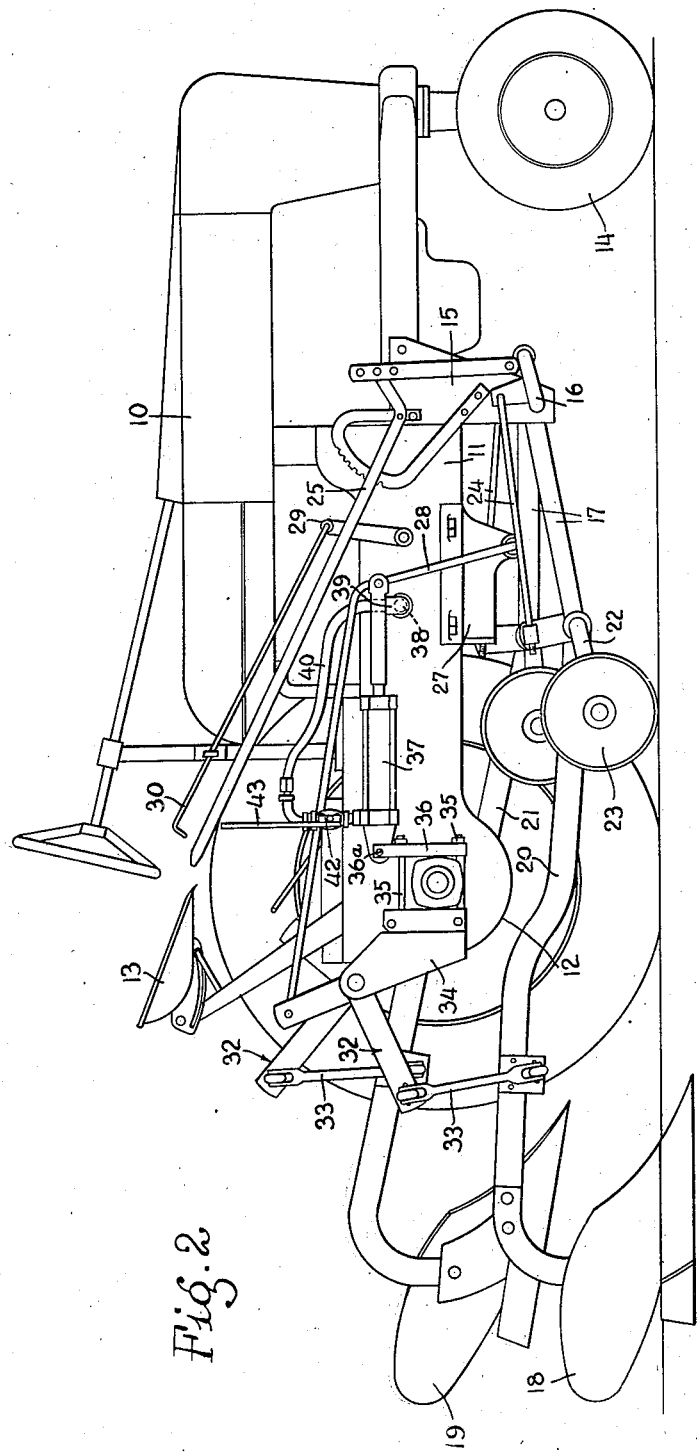
Figure 2 is a view in elevation showing the same power mechanism with the left-hand plow in its raised position while the right-hand plow is in its lowered position.

Referring now particularly to Figures 1 and 2, there is shown a tractor indicated generally at 10 having a main body portion 11 and a rear axle housing 12 extending transversely across the rear of the tractor. On this rear axle housing there is mounted an operator's station 13. The forward portion of the tractor is supported by the usual dirigible wheels 14. To the body portion 11 and intermediately between the rear axle housing 12 and the forward dirigible wheels 14, there is connected a depending bracket 15 including a pair of plates, one rigidly fixed at each side of the tractor. Supported in the lower end of this depending bracket means is a rotatable shaft 16 extending transversely underneath the tractor and serving as a connection means for the usual draft links 17 of the alternate right-hand and left-hand plow bottoms or working tools 18 and 19, respectively. These links 17 extend rearwardly for connection with the ends of the respective plow beams 20 and 21 which carry respectively the plow bottoms 18 and 19. At the union between the rearward end of each drag link 17 and the plow beams 20 and 21, respectively, there is connected a crank arm 22 carrying at its lower end a gauge wheel 23. The crank arm 22 is adapted to be operated by a link 24 extending forwardly for connection with a portion of the shaft 22 adapted to be rotated by manual adjusting means 25 for regulating the plowing depth of the plow bottoms. Since this adjusting means forms no part of the present invention, it is believed that this description is sufficient.

Fitted within the body portion 11 of the tractor is a pump and reservoir housing 27 adapted to extend well within the body housing but having a portion outside of the body housing serving as a support for a cylinder supporting means 28 taking the form of a rod with its lower end turned laterally to fit within the transversely extending opening in the lower portion of the housing 27. Protruding through the body portion 11 from the housing 27, fitted therein, is the usual control lever 29 adapted to be operated by a fore and aft movable rod 30 accessible to the operator's station 13. This housing unit and control means of Figures 1 and 2 is similar to that shown in my pending application, Serial No. 326,059, filed March 26, 1940, and comprises, in general, a pump and control valve to cause fluid to be directed from its pressure side thereof to fluid actuating devices located on the tractor removed from the housing 27. While detail showing is not made in this form of housing unit shown in these Figures 1 and 2, a showing of such detail may be found in the form of unit shown in Figures 3 and 4 to be described hereinafter. The lever 29 will normally be left in a neutral position. When the lever 29 is moved forwardly by the rod 30, fluid passes to the fluid actuating devices after which it may be returned to a neutral position. Upon rearward movement of the lever 29, from its neutral position, fluid is released from the fluid devices, and if some means in addition to the control valve is not provided in the fluid communications to the respective fluid actuating devices, the fluid actuating devices will collapse and both of the implements would move into their working positions.

On the rear axle housing of the tractor and at each side of the operator's station there is provided the usual lifting lever means 32 and including swivel links 33 for connection with the plow beams 20 and 21, respectively. The swivel links 33 permit lateral swinging movement of the plow beams. The lever means may be supported by a bracket structure 34 adapted to be fixed to the transverse axle housing 12 by means of clamping bolts 35 which will also serve to maintain a clamping part 36 located in front of the axle housing 12. On this clamping part 36 there is connected the rear end of a fluid actuating device 37 as at 36a while its forward end may be supported on the supporting link 28 carried for pivotal movement on the housing 27. It should thus be apparent that a more or less common clamping means is provided for the fixing of the lifting lever means 32 and of the fluid actuating device to the rear axle housing of the tractor, all of which making for simplification of a lifting arrangement for directly connecting alternate plows.

Also protruding from each side of the reservoir housing 27 through an opening 38 in said body portion is a fluid outlet 39. A fluid conduit 40 is connected to one of the outlets 39 as shown in Figure 2, it being understood that a second conduit 41 is connected to the outlet 39 at the other side of the body portion 11. Each of said conduits supplies fluid to one of the fluid actuating devices 37. While description is being made more or less with reference to but one of the arrangements on one side of the tractor, it shall be understood that the same will apply to the arrangement on the opposite side of the tractor. Each of the fluid conduits 40 and 41 connect with the respective cylinder devices 37 through an individual controlled valve means 42 adapted to be operated by a projecting arm 43. As viewed in Figure 2, it will be noted that the arm 43 may have a vertical position rearwardly and nearly at right angles with the vertical position. When the lever 43 is vertical, the valve means 42 is open and fluid may thereby pass to the cylinder device 37. When the valve is in a position removed from the vertical position, fluid may be either prevented from flowing into the cylinder device or such fluid as may be already maintained in the fluid device may be held therein to maintain the plow in its transport position independently of operation of the lever 29 to lower the same. If the lever 43 is in a vertical position when lowering is effected by rearward movement of the lever 29, the fluid will return through the communication 40 to the reservoir housing 27 and thereby permit lowering of the plow bottom.

It should now be apparent that by locating the valves 42 in their position on the cylinder devices near to the rear axle housing 12 that they are readily accessible to the operator's station 13. The operator may thereby select either one of the plows 18 or 19 for the plowing operation. This may be done by merely moving one or the other of the individual levers in a position removed from the vertical position to thereby close the valve and to thereby prevent lowering of the particular plow bottom. Each cylinder device 13 provides in effect an individual power lifting means for the respective plow bottoms.

Figure 3:
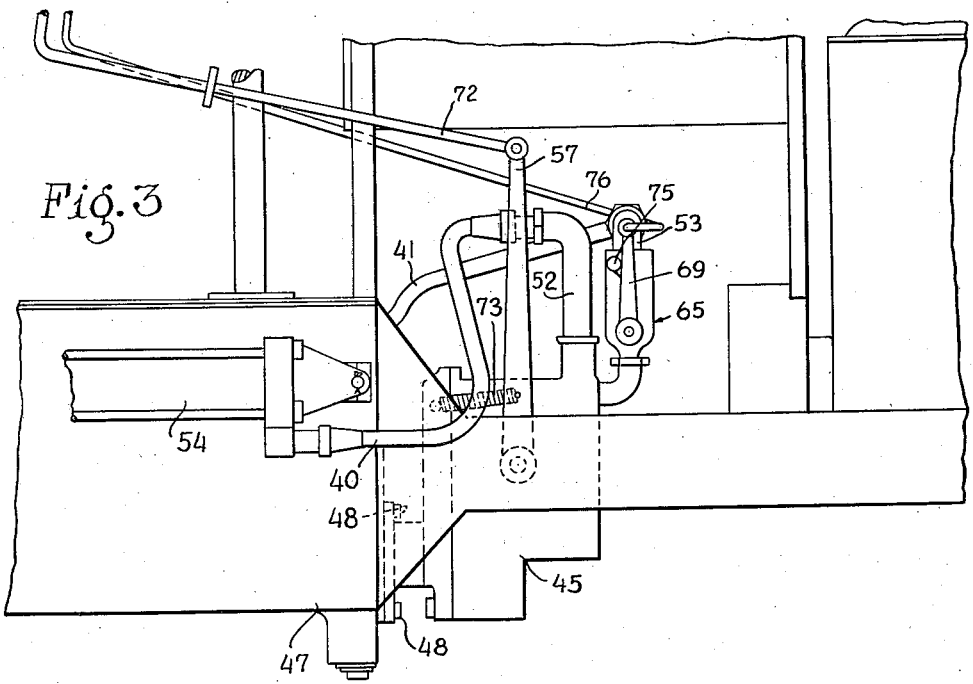
Figure 3 is a view of a tractor and showing a modified form of control mechanism wherein but two manual operating levers are utilized; and, Figure 4 is a view showing in cross-section the pump and reservoir housing with the control mechanism shown in Figure 3.
Figure 4:
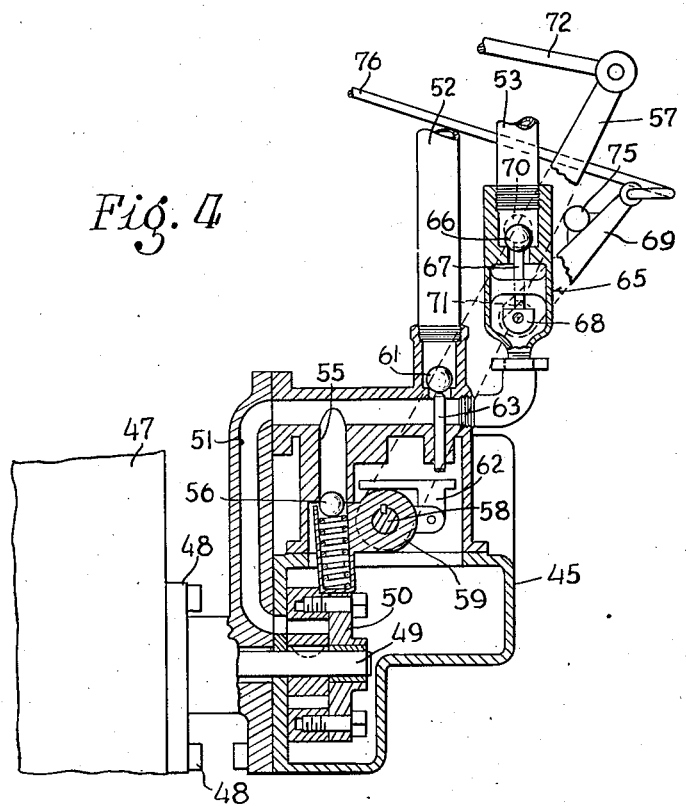

Referring now to the form of invention shown in Figures 3 and 4, it will be noted that there is provided a common pump and reservoir housing but in which there is provided a valve arrangement similar to that which is provided in the reservoir housing 27. The object of the invention has been to provide a control arrangement where less operating levers are needed than for the levers needed in the form of the invention shown in Figures 1 and 2. There is thus provided a housing 45 adapted to be connected to the tractor body 47 and 48. Into this housing there protrudes a driving shaft 49 for operating a pump 50 adapted to receive fluid from the housing 45 and to direct the same through a passageway 51 to fluid communications 52 and 53 which may be connected respectively to fluid actuating cylinders 54, there being one on each side of the tractor. The passage of fluid through the passageway 51 is effected by the closing of the by-pass opening 55 by a spring ball valve 56. This is accomplished by forward movement of a main control lever 57 pivoted at 58 to the housing and having connected thereto a member 59 for supporting the ball valve 56. When the plow bottoms are lifted the lever 57 may be returned to a neutral position and will be normally maintained in that position until it is desired to effect lowering of a plow bottom.

In the fluid communication 52 there is provided a trap valve 61 adapted to be normally closed for the purpose of trapping fluid which may have passed to the cylinder device in communication therewith. But when it is desired to unseat the trap valve 61, the same may be accomplished by the use of the main control lever 57 having a part 62 carried by the members 59 for engagement with a lifting pin 63 underneath the ball valve 61. By rearward movement of the lever 57 to a position in rear of the neutral position and in a counter-clockwise direction, the ball valve 61 will be unseated to thereby permit lowering of the plow at the right-hand side of the tractor.

In the communication 53 to the fluid cylinder device for operating the plow at the left-hand side of the tractor, there may be provided a valve mechanism indicated generally at 65. This mechanism includes a ball valve 66 adapted to be similarly unseated by a pin 67 having its lower end in abutting engagement with a cam means 68 adapted to be rotated by an auxiliary control lever 69. When this control lever 69 is in the position shown in Figure 4, the ball valve 66 will be seated so as to trap fluid which may be in the cylinder device and thereby prevent its return to the reservoir housing 45. If the lever 69 is in the position shown in Figure 3, that is in a vertical position, the pin 67 will be moved vertically to effect the unseating of the ball valve 66 and to retain the valve 66 in a dotted position indicated at 70. The cam means then will be in the position shown in dotted lines at 71. By unseating the valve 66, fluid may be returned to the reservoir housing 45 so that lowering of the left-hand plow bottom may be effected.

The lever 57 may have a rearwardly extending rod 72 for effecting actuation of the same, but this lever 57 will normally be moved to a neutral position by means of a spring 73. The lever 57 is in a neutral position when as shown in Figure 3. The spring 73 is not sufficiently strong to return the lever 57 to a position to effect unseating of the valve 61, the fluid pressure on the valve 61 being sufficient to resist the spring to thereby prevent rearward turning of the lever 57.

The auxiliary lever 69 is so located with respect to the main control lever 57 that it may be engaged by the same. For the purpose of being engaged by the same, means 75 is provided. When the lever 57 is moved forwardly, the lever 69 will also be moved forwardly and be placed in a position whereby it is possible for fluid in the fluid communication 53 to be trapped by the ball valve 66. The lever 57 may be returned to neutral position independently of the lever 69. Connected to the lever 69 there is provided an actuating rod 76 and by the use of this rod 76 the lever 69 may be returned to a vertical position to thereby effect lowering of the implement at the left-hand side of the tractor.

It should be apparent that when the main lever 57 is moved forwardly either one of the implements which may be in the plowing position will be caused to be raised to transporting position. When the lever 57 is returned to its neutral position after effecting raising of the plow, it will be apparent that by pulling rearwardly on either the rod 72 or the rod 76 either the right-hand plow or left-hand plow respectively may be permitted to be lowered into the plowing position.

It will thus be seen that by the use of but two operating rods the positioning of alternate plows may be effected. It should next be seen that by the use of separate cylinders at each side of the tractor and connecting to the respective plows at the respective sides of the tractor that a very simple means has been provided for lifting by power alternate plows connected for movement on the tractor.

While various changes may be made in the detail construction of the various devices, it shall be understood that such changes shall be made within the spirit and scope of the present invention as defined in the appended claims.

What is claimed is:

1. In combination, a tractor having a rear axle housing with an operator's station thereon, alternate right-hand and left-hand plows pivotally connected respectively to the tractor for vertical movement to and from their respective plowing positions and extending rearwardly of the rear axle housing, means for lifting the plows to a lifted position including a pivotal lever means and fluid actuating cylinders for each of the plows, common means at each side of the tractor for fixing the lever means and a cylinder to the rear axle housing in proximity to the operator's station, and individual control valve means carried by each cylinder device for locking one of the cylinder devices, irrespective of the position of the other, in either its lifted or plowing position.

2. In combination, a tractor having a rear axle housing and a body portion extending forwardly therefrom, alternate right-hand and left-hand plows pivotally connected to the body portion forwardly of the rear axle housing and extending to a location rearwardly thereof, fluid lifting means for the plows including a pump and reservoir housing partially fitted within the body portion of the tractor forwardly of the rear axle housing, a fluid cylinder device at each side of the tractor and connected respectively to a plow to lift the same, means for controlling the flow of fluid between the pump and reservoir housing and the cylinder devices, and means carried by the reservoir housing for supporting respectively the forward ends of the fluid cylinder devices.

3. In combination, a tractor having a rear axle housing and a body portion extending forwardly therefrom, alternate right-hand and left-hand plows pivotally connected to the body portion forwardly of the rear axle housing and extending to a location rearwardly thereof, fluid lifting means for the plows including a pump and reservoir housing partially fitted within the body portion of the tractor forwardly of the rear axle housing, a pivotal lever means connected to each of the plows and a fluid actuating cylinder device at each side of the tractor connected respectively to the pivotal lever means, common means at each side of the tractor for fixing the lever means and a cylinder device to the rear axle housing, means carried by the reservoir housing for supporting respectively the forward ends of the fluid cylinder devices, and means for controlling the flow of fluid between the pump and reservoir housing and the cylinder devices.

4. In combination, a tractor, alternate right-hand and left-hand plows connected to the tractor for vertical movement to and from their respective plowing positions, a fluid lifting arrangement including a fluid cylinder device connected to each of the plows to lift the same, fluid pump and reservoir means for delivering fluid to the cylinder devices, common control means for causing fluid to be directed toward the cylinder devices, fluid communication means between the pump and each fluid cylinder device, a trap valve normally biased to a closed position in each of the fluid communications to maintain fluid in the cylinder device to retain a plow in a position removed from its plowing position, manual operating means for each valve for overcoming the bias of each valve independently of each other, whereby one or the other of the plows may be released for movement to its plowing position.

5. In combination, a tractor, alternate right-hand and left-hand plows connected to the tractor for vertical movement to and from their respective plowing positions, a fluid lifting arrangement including a fluid cylinder device connected to each of the plows to lift the same, fluid pump and reservoir means for delivering fluid to the cylinder devices, fluid communication between the pump and reservoir means and each of the cylinder devices, a trap valve normally biased to a closed position in each of the fluid communications, main control means for causing fluid to be directed to the cylinder devices to move the plows and including a single operating lever, a second lever for controlling the position of the trap valve in one of the communications, and means upon the operation of the first lever in one direction engaging with the second lever to position the same for trapping of the fluid to retain the plow in its lifted position.

6. In combination, a tractor, alternate right-hand and left-hand plows connected to the tractor for vertical movement to and from their respective plowing positions, a fluid lifting arrangement including a fluid cylinder device connected to each of the plows to lift the same, a fluid pump and reservoir means for delivering fluid to the cylinder devices, fluid communications between the pump and each of the cylinder devices, a trap valve normaly biased to a closed position in each of the fluid communications, main control means for causing fluid to be directed to the cylinder devices to move the implements and including a single operating lever, a second lever for controlling the position of the trap valve in one of the communications, and means upon the operation of the first lever in one direction engaging with the second lever to position the same for trapping of the fluid to retain the plow in its lifted position, said first lever controlling upon movement in a reverse direction the unseating of the other of said trap valves, whereby upon operation of either of the levers one of the plows may be dropped to its plowing position.

7. In a vehicular earth-working machine including an operator's station and earth-working tools transferable between earth-working and transport positions, the combination of fluid-pressure-differential motors respectively operably associated with said tools for transferring the same to the transport position when energized by subjection to the pressure of fluid within a certain pressure range, and a system for controlling the energization of said motors comprising a source of fluid within such pressure range, conduits communicative between said source and said motors, a primary system-control means in control of said source and manipulatable to establish an operable relation between said source and said conduits for subjection of the motors to the pressure of fluid at said source in said pressure range, said control means being accessible from said station for such manipulation, and selective conduit control means associated with said conduits and manipulatable into one adjustment wherein both conduits are unobstructed for communicating between said source and the motors to cause energization of both motors upon the establishment of the aforesaid operable relation of the primary control means and manipulatable into alternative other adjustments wherein a respectively selected of said conduits is obstructed to preserve the instant pressure subjection and hence the status quo of its motor while the other of said conduits is unobstructed to place the energization of its motor under the control of the primary control means, and said selective control means being also accessible for manipulation from said station.

8. In a vehicular earth-working machine including an operator's station and earth-working tools transferable between earth-working and transport positions, the combination of fluid-pressure-differential motors respectively operably associated with said tools for transferring the same to the transport position when energized by subjection to the pressure of fluid within a certain pressure range, and a system for controlling the energization of said motors comprising a source of fluid within such pressure range, conduits communicative between said source and said motors, a primary system-control means including a primary valve interposed between said source and said conduits and a control member for manipulating said valve to establish or terminate communication between said source and said conduits, said control member being accessible from said station for such manipulation, and selective conduit control means comprising selective valves respectively in said conduits and including control members for respectively independently manipulating said selective valves to cause concurrent or preselected subjection of the motors to the pressure of fluid at said source upon communication manipulation of the primary valve and to cause concurrent or preselected retention or dissipation of such pressure subjection upon communication-terminating manipulation of the primary valve, and said selective valve control members also being accessible for manipulation from said station.

9. In combination, a tractor, working tools connected to the tractor for vertical movement to and from their respective working positions, a fluid arrangement for moving the working tools including a fluid actuated device connected to each of the working tools to move the same, fluid pump means for delivering fluid to the fluid actuated devices, fluid communications between the pump means and each of the fluid actuated devices, valve means in each fluid communication and manipulative from a two-way-flow condition wherein fluid is flowable to or from said devices to a one-way-flow condition in which fluid is flowable only to said devices, main control means including a lever movable for causing fluid to be directed through the communications to the fluid actuated devices, means operable under control of said movement of said lever for effecting such manipulation of the valve means in one of said communications, a second lever for controlling the valve means in the other of the communications, and means operable under control of and upon said movement of the first lever for moving the second lever to a position corresponding to the aforesaid manipulation of the other valve means, wherefore because of said manipulations of the valve means fluid will be trapped in the communications for holding the devices operated.

10. In a vehicular machine including ground-working tools transferable between working and transport positions, the combination of fluid-pressure-differential motors respectively connected with said tools and operable to transfer said tools to the transport position when energized by subjection to the pressure of fluid within a certain pressure range, a source of fluid within such pressure range, conduits respectively communicative between said motors and said source, valve means respectively associated with said conduits and manipulatable into one operating stage wherein said conduits subject their motors to fluid communicated from said source, said valve means being subsequently manipulatable into second respective stages for dissipating the fluid pressure at such range in their conduits to de-energize said motors, a single control member operably associated with both of said valve means for manipulating the same into the first operating stage and for manipulating one of the valve means into its second stage, and a second control member operably associated with the other valve means for manipulating the same into its second stage, and said control members being operable in selected sequence in obtaining the second operating stages of the valve means.

11. In a vehicular machine including ground-working tools transferable between working and transport positions, the combination of fluid-pressure-differential motors respectively connected with said tools and operable to transfer them to the transport position when energized by subjection to the pressure of fluid within a certain pressure range, a fluid circulatory system having relatively high and low pressure sides, conduits respectively communicative between said motors and the high pressure side of the circulatory system, a by-pass passage communicative between the low and high sides of said system, a by-pass valve in control of said passage and manipulatable to a passage constricting adjustment causing the development of pressure within the motor energizing range within said high pressure side and also manipulatable to a passage clearing adjustment causing the by-pass of sufficient fluid for the pressure therein to drop below the motor energizing range, one-way-flow valves respectively associated with said conduits and having a normal adjustment permitting the flow of fluid only toward the motors but manipulatable into a two-way-flow adjustment to permit flow toward the high pressure side of said system, a single control member operably associated with all of said valves and operable to manipulate them to first create the constricting adjustment of the by-pass valve concurrently with the normal adjustment of the one-way-flow valves to subject the motors to energizing pressure and subsequently to manipulate the by-pass valve into its passage clearing adjustment, said control member being further operable to manipulate one of said one-way-flow valves into its two-way-flow adjustment to provide for the escape through its conduit of motor-energizing fluid into the circulatory system, and a second control member operably associated with the other one-way-flow valve for manipulating the same into its two-way-flow adjustment to provide for the escape through its conduit of motor-energizing fluid into the circulatory system, and said control members being operable in selected sequence for creating the two-way flow adjustment of said valves subsequent to the passage clearing adjustment of the by-pass valve.

CARL W. MOTT.